(12) United States Patent
Lee et al.

(10) Patent No.: US 12,457,331 B2
(45) Date of Patent: Oct. 28, 2025

(54) VIDEO DECODING METHOD AND APPARATUS USING THE SAME

(71) Applicant: Electronics and Telecommunications Research Institute, Daejeon (KR)

(72) Inventors: Jin Ho Lee, Daejeon (KR); Jung Won Kang, Daejeon (KR); Ha Hyun Lee, Seoul (KR); Jin Soo Choi, Daejeon (KR); Jin Woong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 18/499,965

(22) Filed: Nov. 1, 2023

(65) Prior Publication Data
US 2024/0064299 A1    Feb. 22, 2024

Related U.S. Application Data

(63) Continuation of application No. 17/532,442, filed on Nov. 22, 2021, now Pat. No. 11,843,773, which is a
(Continued)

(30) Foreign Application Priority Data

Jul. 9, 2013    (KR) .................. 10-2013-0080033
May 30, 2014    (KR) .................. 10-2014-0066012

(51) Int. Cl.
*H04N 19/117*    (2014.01)
*H04N 19/105*    (2014.01)
(Continued)

(52) U.S. Cl.
CPC ......... *H04N 19/117* (2014.11); *H04N 19/105* (2014.11); *H04N 19/124* (2014.11);
(Continued)

(58) Field of Classification Search
None
See application file for complete search history.

(56) References Cited

U.S. PATENT DOCUMENTS 8,467,459 B2    6/2013    Yin et al.
2007/0286283 A1    12/2007    Yin et al.
(Continued)

FOREIGN PATENT DOCUMENTS

| KR | 1020120138712 A | 12/2012 |
| KR | 1020130037193 A | 4/2013 |
| WO | 2012148139 A2 | 11/2012 |

OTHER PUBLICATIONS

Hahyun Lee et al., Scalable Extension of HEVC for Flexible High-Quality Digital Video Content Services, ETRI Journal, vol. 35, No. 6, Dec. 2013, pp. 990-1000.
(Continued)

*Primary Examiner* — Talha M Nawaz
(74) *Attorney, Agent, or Firm* — BROADVIEW IP LAW, PC

(57) ABSTRACT

A video decoding method according to an embodiment of the present invention may include determining a type of a filter to be applied to a first-layer picture which a second-layer picture as a decoding target refers to; determining a filtering target of the first-layer picture to which the filter is applied; filtering the filtering target based on the type of the filter; and adding the filtered first-layer picture to a second-layer reference picture list. Accordingly, the video decoding method and an apparatus using the same may reduce a prediction error in an upper layer and enhance encoding efficiency.

5 Claims, 14 Drawing Sheets

Related U.S. Application Data continuation of application No. 16/691,203, filed on Nov. 21, 2019, now Pat. No. 11,212,526, which is a continuation of application No. 16/013,419, filed on Jun. 20, 2018, now Pat. No. 10,516,883, which is a continuation of application No. 15/343,887, filed on Nov. 4, 2016, now Pat. No. 10,027,959, which is a continuation of application No. 14/326,232, filed on Jul. 8, 2014, now Pat. No. 9,510,001.

(51) Int. Cl.
| | | |
|---|---|---|
| H04N 19/124 | (2014.01) | |
| H04N 19/13 | (2014.01) | |
| H04N 19/14 | (2014.01) | |
| H04N 19/159 | (2014.01) | |
| H04N 19/176 | (2014.01) | |
| H04N 19/30 | (2014.01) | |
| H04N 19/51 | (2014.01) | |
| H04N 19/61 | (2014.01) | |
| H04N 19/80 | (2014.01) | |
| H04N 19/172 | (2014.01) | |

(52) U.S. Cl.
CPC ............ *H04N 19/13* (2014.11); *H04N 19/14* (2014.11); *H04N 19/159* (2014.11); *H04N 19/176* (2014.11); *H04N 19/30* (2014.11); *H04N 19/51* (2014.11); *H04N 19/61* (2014.11); *H04N 19/80* (2014.11); *H04N 19/172* (2014.11)

(56) References Cited

U.S. PATENT DOCUMENTS

| | | |
|---|---|---|
| 2011/0191303 A1 | 8/2011 | Kaufman et al. |
| 2012/0044322 A1* | 2/2012 | Tian ...................... H04N 19/70 348/E13.001 |
| 2012/0063692 A1 | 3/2012 | Kim et al. |
| 2012/0147961 A1 | 6/2012 | Guo et al. |
| 2012/0224625 A1 | 9/2012 | Wang et al. |
| 2013/0038625 A1 | 2/2013 | Nakajima |
| 2013/0259118 A1 | 10/2013 | Fu et al. |
| 2013/0279576 A1 | 10/2013 | Chen et al. |
| 2014/0003538 A1 | 1/2014 | Ramasubramonian et al. |
| 2014/0049604 A1* | 2/2014 | Chen ...................... H04N 19/70 348/43 |
| 2014/0064386 A1 | 3/2014 | Chen et al. |
| 2014/0072031 A1* | 3/2014 | Xiu ...................... H04N 19/117 375/240.02 |
| 2014/0086325 A1 | 3/2014 | Chen et al. |
| 2014/0098880 A1 | 4/2014 | Seregin et al. |
| 2014/0218473 A1 | 8/2014 | Hannuksela et al. |
| 2014/0294097 A1* | 10/2014 | Seregin .................. H04N 19/31 375/240.26 |
| 2014/0301457 A1 | 10/2014 | Pu et al. |
| 2014/0301466 A1 | 10/2014 | Li et al. |
| 2014/0362910 A1 | 12/2014 | Seregin et al. |
| 2015/0023419 A1 | 1/2015 | Chen et al. |
| 2015/0189298 A1 | 7/2015 | Ye et al. |
| 2015/0312571 A1 | 10/2015 | Kim et al. |
| 2016/0100163 A1 | 4/2016 | Rapaka et al. |
| 2016/0134868 A1 | 5/2016 | He et al. |
| 2016/0156917 A1 | 6/2016 | Ugur et al. |
| 2016/0212436 A1 | 7/2016 | Laude et al. |
| 2016/0212438 A1 | 7/2016 | Andersson et al. |

OTHER PUBLICATIONS

Ohji Nakagami et al., AHG9: On initialization process of reference picture lists for HEVC extensions, Joint Collaborative Team on Video Coding (JCT-VC)of ITU-T SG 16 WP 3 and ISO/IEC JTC 1/SC 29/WG 11, Incheon, KR, Apr. 18-26, 2013.

* cited by examiner

FIG. 7

| $R_{(-1,-1)}$ | $R_{(-1,0)}$ | $R_{(-1,1)}$ | $R_{(-1,2)}$ | $R_{(-1,3)}$ |
|---|---|---|---|---|
| $R_{(0,-1)}$ | $R_{(0,0)}$ | $R_{(0,1)}$ | $R_{(0,2)}$ | $R_{(0,3)}$ |
| $R_{(1,-1)}$ | $R_{(1,0)}$ | $R_{(1,1)}$ | $R_{(1,2)}$ | $R_{(1,3)}$ |
| $R_{(2,-1)}$ | $R_{(2,0)}$ | $R_{(2,1)}$ | $R_{(2,2)}$ | $R_{(2,3)}$ |
| $R_{(3,-1)}$ | $R_{(3,0)}$ | $R_{(3,1)}$ | $R_{(3,2)}$ | $R_{(3,3)}$ |

FIG. 11C

| List 0 | 1 | 0 | 3 | 4 | F0 | F1 |

| List 1 | 3 | 4 | 1 | 0 | F2 | F3 |

VIDEO DECODING METHOD AND APPARATUS USING THE SAME

CROSS-REFERENCE TO RELATED APPLICATION

This application is a continuation application of U.S. application Ser. No. 17/532,442, filed Nov. 22, 2021, which is a continuation application of U.S. application Ser. No. 16/691,203, filed Nov. 21, 2019, which is a continuation application of U.S. application Ser. No. 16/013,419, filed on Jun. 20, 2018, which is a continuation application of U.S. application Ser. No. 15/343,887, filed on Nov. 4, 2016, which is a continuation application of U.S. application Ser. No. 14/326,232, filed on Jul. 8, 2014, and the present application claims the benefit of priority under 35 U.S.C. § 119(a) to Korean Patent Applications No. 10-2013-0080033 filed on Jul. 9, 2013 and No. 10-2014-0066012 filed on May 30, 2014, in the Korean Intellectual Property Office, which is incorporated by reference in its entirety herein.

TECHNICAL FIELD

The present invention relates to video encoding and decoding, and more particularly, to a method and apparatus for encoding and decoding a video supporting a plurality of layers in a bit stream.

BACKGROUND ART

In recent years, as high definition (HD) broadcast services are spreading domestically and globally, a large number of users are getting used to high-resolution and high-quality videos and accordingly institutions put spurs to the development of next-generation video devices. Also, with growing interest in ultrahigh-definition (UHD) services having a resolution four times higher than HDTV, compression techniques for higher-quality videos are needed.

For video compression, there may be used an inter prediction technique of predicting pixel values included in a current picture from temporally previous and/or subsequent pictures of the current picture, an intra prediction technique of predicting pixel values included in a current picture using pixel information in the current picture, or an entropy encoding technique of assigning a short code to a symbol with a high appearance frequency and assigning a long code to a symbol with a low appearance frequency.

Video compression technology may include a technique of providing a constant network bandwidth in restricted operating environments of hardware without considering variable network environments. However, to compress video data used for network environments involving frequent changes of bandwidths, new compression techniques are required, wherein a scalable video encoding/decoding method may be employed.

DISCLOSURE

Technical Problem

An aspect of the present invention is to provide a video encoding/decoding method using inter-layer filtering, and an apparatus using the same.

Another aspect of the present invention is to provide a video decoding method of adaptively applying one or more filters to a lower-layer picture and adding the picture to a reference picture list for an upper layer to reduce a prediction error in the upper layer and to improve coding efficiency, and an apparatus using the same.

Still another aspect of the present invention is to provide a video decoding method for enhancing coding efficiency without increasing the reference picture list, and an apparatus using the same.

Technical Solution

An embodiment of the present invention provides a video decoding method supporting a plurality of layers, the video decoding method including determining a type of a filter to be applied to a first-layer picture which a second-layer picture as a decoding target refers to; determining a filtering target of the first-layer picture to which the filter is applied; filtering the filtering target based on the type of the filter; and adding the filtered first-layer picture to a second-layer reference picture list.

The determining of the type of the filter may determine to apply a fixed filter to the first-layer picture.

The fixed filter may be a default filter having a preset filter coefficient set, and when the default filter is employed, a sample at an integer position may be unfiltered.

The fixed filter may be an alternative filter having a preset filter coefficient set, and when the alternative filter is employed, a sample at an integer position may be filtered.

The alternative filter may be applied to the first-layer picture which is subjected to the default filter.

The determining of the type of the filter may further include receiving and decoding a flag signal about whether to apply the alternative filter.

The determining of the type of the filter may determine to adaptively select and apply one or more filters to the first-layer picture.

The determining of the type of the filter may include determining to apply a default filter having a preset filter coefficient set to the first-layer picture and determining whether to apply an alternative filter different from the default filter to a sample at an integer position in the first-layer picture, and the determining whether to apply the alternative filter may receive and decode a flag signal indicating whether to apply the alternative filter.

The determining of the type of the filter may include determining to apply a default filter having a preset filter coefficient set to the first-layer picture and determining whether to apply an alternative filter different from the default filter to a sample at an integer position in the first-layer picture, and the determining whether to apply the alternative filter may include calculating a sample correlation in each block unit with a predetermined size of the first-layer picture; and determining whether to the alternative filter to the first-layer picture based on the correlation.

The determining whether to apply the alternative filter may determine to apply the alternative filter when block activity of the block unit based on horizontal activity and vertical activity of the block unit is a predetermined threshold or greater.

Another embodiment of the present invention provides a video decoding apparatus supporting a plurality of layers, the video decoding apparatus including a decoding module to decode a first-layer picture which a second-layer picture as a decoding target refers to; a filter module to determine a type of a filter to be applied to the first-layer picture, to determine a filtering target of the first-layer picture to which the filter is applied, and to filter the filtering target based on the type of the filter; and a prediction module to add the filtered first-layer picture to a second-layer reference picture list.

Advantageous Effects

According to an embodiment of the present invention, there are provided a video encoding/decoding method using inter-layer filtering, and an apparatus using the same.

Also, there are provided a video decoding method of adaptively applying one or more filters to a lower-layer picture and adding the picture to a reference picture list for an upper layer to reduce a prediction error in the upper layer and to improve coding efficiency, and an apparatus using the same.

In addition, there are provided a video decoding method for enhancing coding efficiency without increasing the reference picture list, and an apparatus using the same.

DESCRIPTION OF DRAWINGS

FIG. 7 illustrates block samples for calculating horizontal activity and vertical activity according to the present invention.

FIG. 11A, FIG. 11B and FIG. 11C illustrate a reference picture list for a B slice according to an exemplary embodiment of the present invention.

MODE FOR INVENTION

Hereinafter, embodiments of the present invention are described in detail with reference to the accompanying drawings. In describing the embodiments of the present invention, a detailed description of related known elements or functions will be omitted if it is deemed to make the gist of the present invention unnecessarily vague.

It will be understood that when an element is referred to as being "connected" or "coupled" to another element, the element can be directly connected or coupled to another element or intervening elements. Also, when it is said that a specific element is "included," it may mean that elements other than the specific element are not excluded and that additional elements may be included in the embodiments of the present invention or the scope of the technical spirit of the present invention.

Although the terms "first," "second," etc. may be used to describe various elements, these elements should not be limited by these terms. These terms are used only to distinguish one element from another element. For example, a first element may be named a second element without departing from the scope of the present invention. Likewise, a second element may be named a first element.

Although components described in the embodiments of the present invention are independently illustrated in order to show different characteristic functions, such a configuration does not indicate that each component is constructed by a separate hardware constituent unit or software constituent unit. That is, each component includes individual components that are arranged for convenience of description, in which at least two components may be combined into a single component or a single component may be divided into a plurality of components to perform functions. It is to be noted that embodiments in which some components are integrated into one combined component and/or a component is divided into multiple separate components are included in the scope of the present invention without departing from the essence of the present invention.

Some constituent elements are not essential to perform the substantial functions in the invention and may be optional constituent elements for merely improving performance. The present invention may be embodied by including only constituent elements essential to implement the spirit of the invention other than constituent elements used for merely improving performance. A structure including only the essential constituent elements other than optional constituents used for merely improving performance also belongs to the scope of the present invention.

Figure 1:
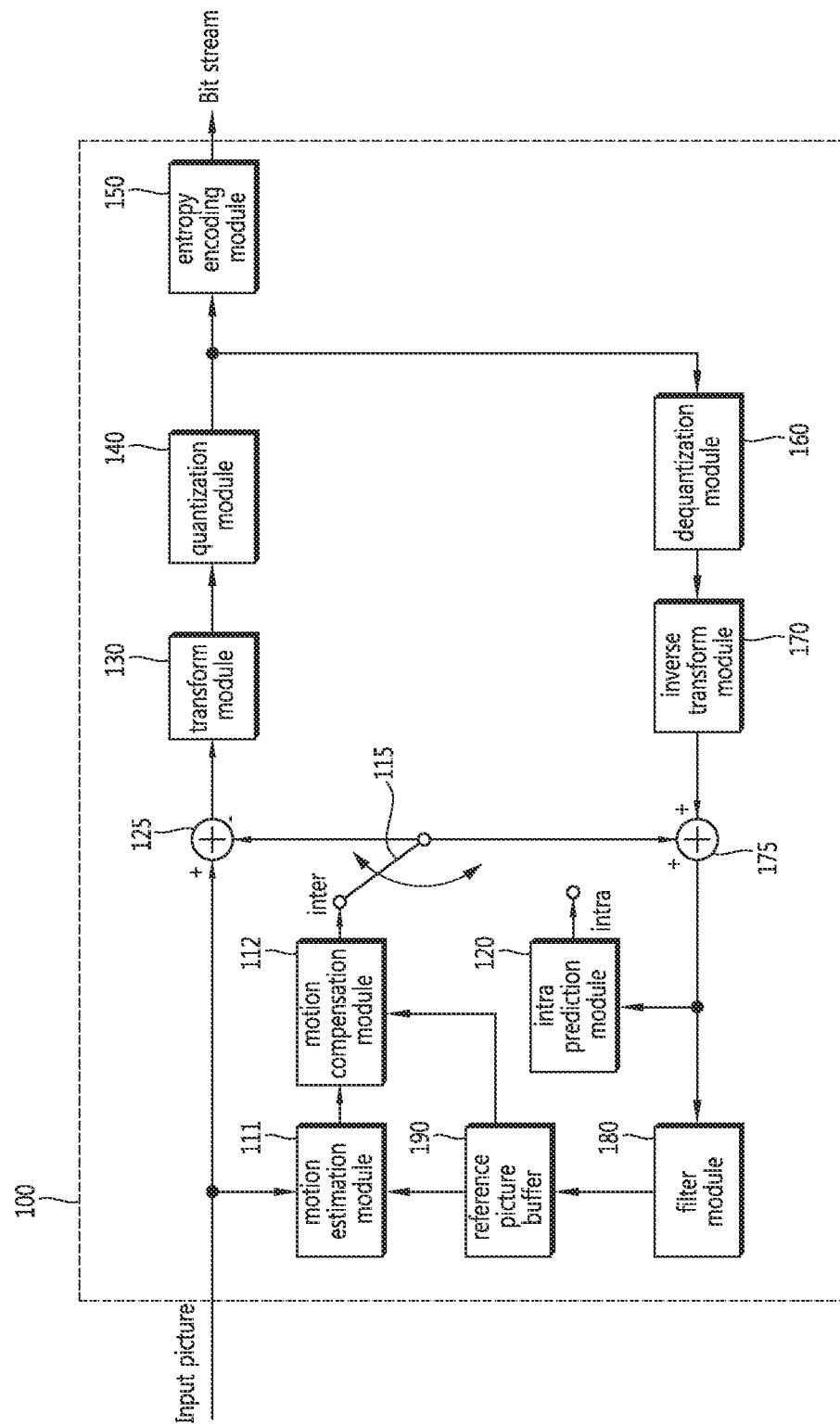
FIG. 1 is a block diagram illustrating a configuration of a video encoding apparatus according to an exemplary embodiment.

FIG. 1 is a block diagram illustrating a configuration of a video encoding apparatus according to an exemplary embodiment. A scalable video encoding/decoding method or apparatus may be realized by extension of a general video encoding/decoding method or apparatus that does not provide scalability, and the block diagram of FIG. 1 illustrates an example of a video encoding apparatus which may form a basis of a scalable video encoding apparatus.

Referring to FIG. 1, the video encoding apparatus 100 includes a motion estimation module 111, a motion compensation module 112, an intra prediction module 120, a switch 115, a subtractor 125, a transform module 130, a quantization module 140, an entropy encoding module 150, an dequantization module 160, an inverse transform module 170, an adder 175, a filter module 180, and a reference picture buffer 190.

The video encoding apparatus 100 may encode an input picture images in an intra mode or an inter mode and output a bitstream. Intra prediction means an intra-picture prediction, and inter prediction means an inter-picture prediction. In the intra mode, the switch 115 is shifted to 'intra,' and in the inter mode, the switch 115 is shifted to 'inter.' The video encoding apparatus 100 may generate a prediction block for an input block of the input picture and then encode a difference between the input block and the prediction block.

In the intra mode, the intra prediction module 120 may perform a spatial prediction by using a pixel value of a pre-encoded block around a current block to generate a prediction block.

In the inter mode, the motion estimation module 111 may obtain a region which is most matched with the input block in the reference picture stored in the reference picture buffer 190 during a motion estimation process to derive a motion vector. The motion compensation module 112 may perform motion compensation using the motion vector and the reference picture stored in the reference picture buffer 190, thereby generating the prediction block.

The subtractor 125 may generate a residual block based on the difference between the input block and the generated prediction block. The transform module 130 may transform the residual block to output a transform coefficient. The quantization module 140 may quantize the transform coefficient according to a quantization parameter to output a quantized coefficient.

The entropy encoding module 150 may entropy-encode a symbol according to probability distribution based on values derived by the quantization module 140 or an encoding parameter value derived in encoding, thereby outputting a bitstream. Entropy encoding is a method of receiving symbols having different values and representing the symbols as a decodable binary sequence or string while removing statistical redundancy.

Here, a symbol means a syntax element as an encoding/decoding target, a coding parameter, a value of a residual signal, or the like. A coding parameter, which is a parameter necessary for encoding and decoding, may include information encoded by the encoding apparatus and transferred to the decoding apparatus, such as a syntax element, and information to be inferred during an encoding or decoding process and means information necessary for encoding and decoding a picture. The coding parameter may include, for example, values or statistics of an intra/inter prediction mode, a displacement/motion vector, a reference picture index, a coding block pattern, presence and absence of a residual signal, a transform coefficient, a quantized transform coefficient, a block size and block partition information. A residual signal may denote a difference between an original signal and a prediction signal, a transformed signal of the difference between the original signal and the prediction signal, or a transformed and quantized signal of the difference between the original signal and the prediction signal. The residual signal may be referred to as a residual block in a block unit.

When entropy encoding is applied, a symbol having a high probability is allocated a small number of bits and a symbol having a low probability is allocated a large number of bits in representation of symbols, thereby reducing a size of bit strings for symbols to be encoded. Accordingly, entropy encoding may enhance compression performance of video encoding.

For entropy encoding, encoding methods, such as exponential Golomb, context-adaptive variable length coding (CAVLC) and context-adaptive binary arithmetic coding (CABAC), may be used. For example, a table used for performing entropy encoding, such as a variable length coding/code (VLC) table, may be stored in the entropy encoding module 150, and the entropy encoding module 150 may perform entropy encoding using the stored VLC table. In addition, the entropy encoding module 150 may derive a binarization method of a target symbol and a probability model of a target symbol/bin and perform entropy encoding using the derived binarization method or probability model.

The quantized coefficient may be dequantized by the dequantization module 160 and inversely transformed by the inverse transform module 170. The dequantized and inversely transformed coefficient is added to the prediction block by the adder 175, thereby generating a reconstructed block.

Figure 2:
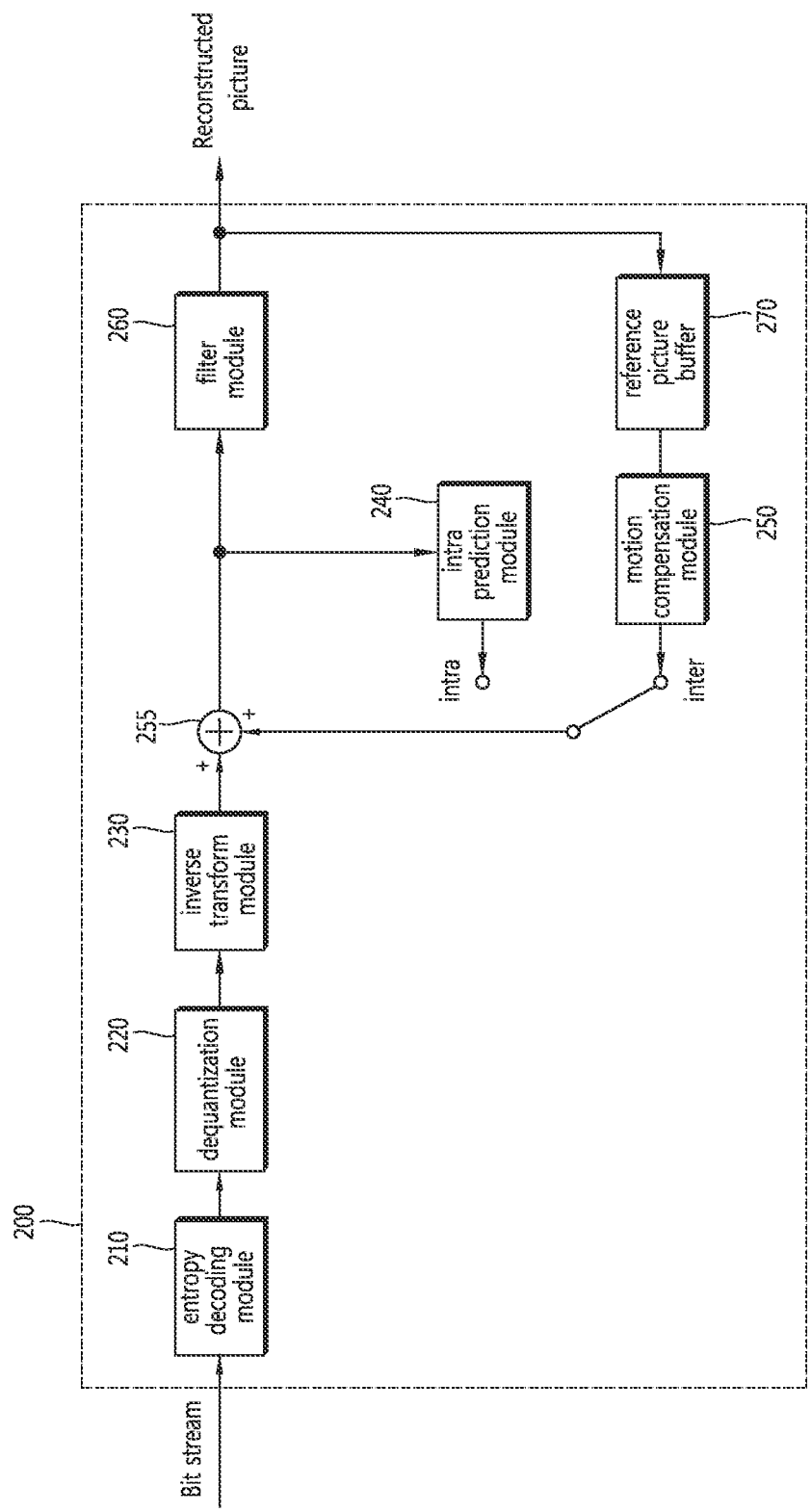
FIG. 2 is a block diagram illustrating a configuration of a video decoding apparatus according to an exemplary embodiment.

The reconstructed block is subjected to the filter module 180, and the filter module 180 may apply at least one of a deblocking filter, a sample adaptive offset (SAO), and an adaptive loop filter (ALF) to the reconstructed block or a reconstructed picture. The reconstructed block obtained via the filter module 180 may be stored in the reference picture buffer 190. FIG. 2 is a block diagram illustrating a configuration of a video decoding apparatus according to an exemplary embodiment. As described above in FIG. 1, a scalable video encoding/decoding method or apparatus may be realized by extension of a general video encoding/decoding method or apparatus that does not provide scalability, and the block diagram of FIG. 2 illustrates an example of a video decoding apparatus which may form a basis of a scalable video decoding apparatus.

Referring to FIG. 2, the video decoding apparatus 200 includes an entropy-decoding module 210, a dequantization module 220, an inverse transform module 230, an intra prediction module 240, a motion compensation module 250, a filter module 260, and a reference picture buffer 270.

The video decoding apparatus 200 receives an input bitstream output from the encoding apparatus and decodes the bitstream in an intra mode or inter mode to output a reconstituted picture, that is, a reconstructed picture. In the intra mode, a switch may be shifted to 'intra,' and in the inter mode, the switch may be shifted to 'inter. The video decoding apparatus 200 may obtain a residual block reconstructed from the input bit stream, generate a prediction block, and add the residual block and the prediction block to generate a reconstituted block, that is, a reconstructed block.

The entropy decoding module 210 may entropy-decode the input bitstream according to probability distribution to generate symbols including a symbol in a form of a quantized coefficient. Entropy decoding is a method of receiving a binary sequence to generate symbols. The entropy decoding method is similar to the aforementioned entropy encoding method.

The quantized coefficient is dequantized by the dequantization module 220 and inversely transformed by the inverse transform module 230, thereby generating a reconstructed residual block.

In the intra mode, the intra prediction module 240 may perform a spatial prediction by using a pixel value of a pre-encoded block around a current block to generate a prediction block. In the inter mode, the motion compensation module 250 may perform motion compensation using a motion vector and a reference picture stored in the reference picture buffer 270, thereby generating a prediction block.

The reconstructed residual block and the prediction block are added by an adder 255, and the added blocks are subjected to the filter module 260. The filter module 260 may apply at least one of a deblocking filter, an SAO, and an ALF to the reconstructed block or the reconstructed picture. The filter module 260 outputs the reconstituted picture, that is, the reconstructed picture. The reconstructed picture may be stored in the reference picture buffer 270 to be used for inter prediction.

Components directly related to video decoding among the entropy decoding module 210, the dequantization module 220, the inverse transform module 230, the intra prediction module 240, the motion compensation module 250, the filter module 260 and the reference picture buffer 270 included in the video decoding apparatus 200, for example, the entropy decoding module 210, the dequantization module 220, the inverse transform module 230, the intra prediction module 240, the motion compensation module 250 and the filter module 260, may be defined as a decoder or a decoding unit, separately from the other components.

In addition, the video decoding apparatus 200 may further include a parsing module (not shown) to parse information about an encoded video included in the bit stream. The parsing module may include the entropy decoding module 210 or be included in the entropy decoding module 210. The parsing module may be configured as one component of the decoding module.

Figure 3:
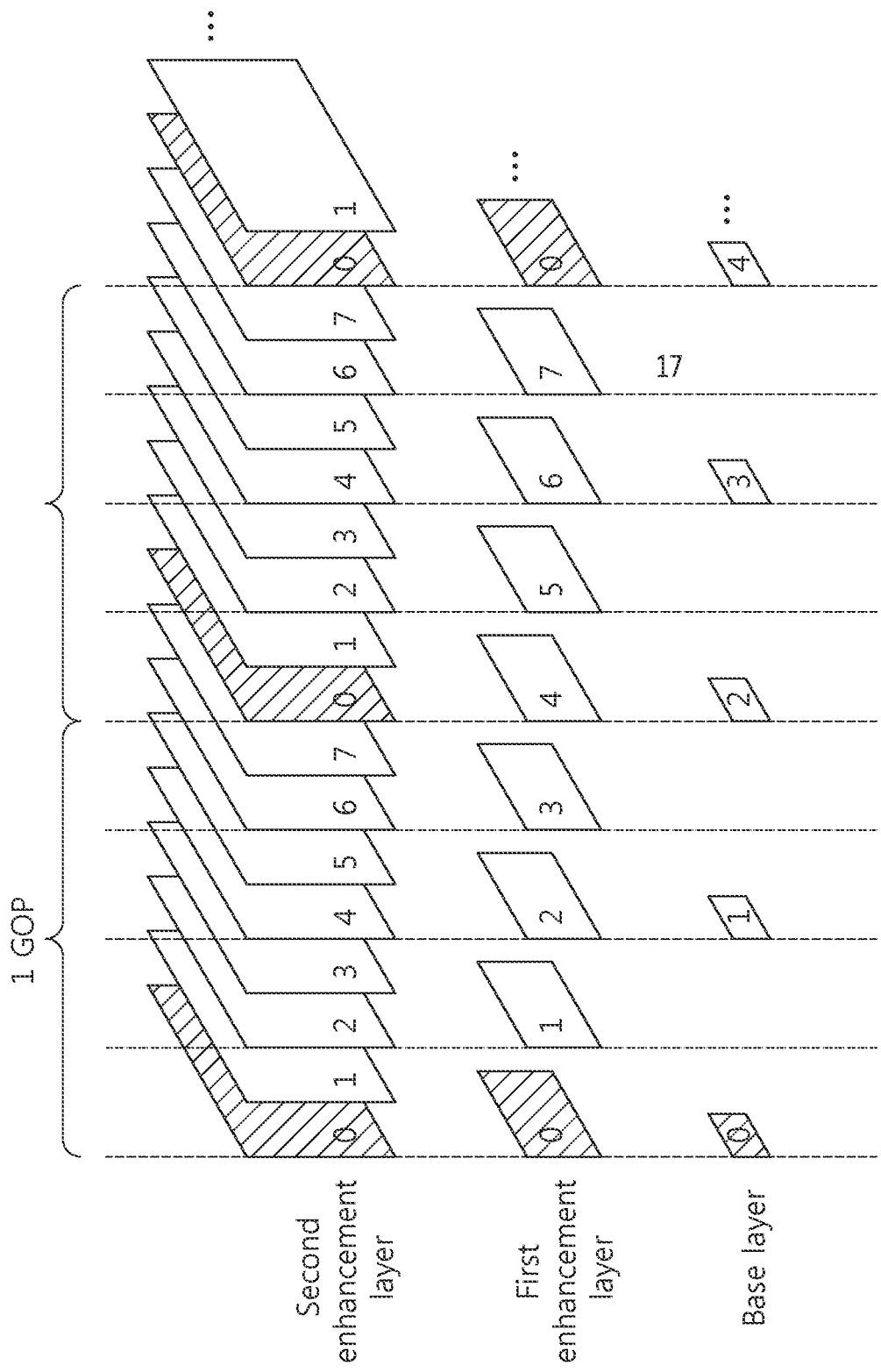
FIG. 3 is a conceptual diagram schematically illustrating a scalable video coding structure using a plurality of layers according to an exemplary embodiment of the present invention.

FIG. 3 is a conceptual diagram schematically illustrating a scalable video coding structure using a plurality of layers according to an exemplary embodiment of the present invention. In FIG. 3, Group of Picture (GOP) denotes a picture group, that is, a group of pictures.

In order to transmit video data, a transmission medium is needed, and performance thereof is different by each transmission medium according to various network environments. For application to various transmission media or network environments, a scalable video coding method may be provided.

The scalable video coding method is a coding method which utilizes texture information, motion information, residual signals between layers, or the like to remove redundancy between layers, thus improving encoding/decoding performance. The scalable video coding method may provide scalability in various spatial, temporal, and quality aspects according to ambient conditions such as a transmission bit rate, a transmission error rate, and a system resource.

Scalable video coding may be performed by using a multi-layer structure so as to provide a bitstream applicable to various network situations. For example, the scalable video coding structure may include a base layer in which video data is compressed and processed using a general video encoding method, and also include an enhancement layer in which video data is compressed and processed using both coding information of the base layer and a general video encoding method.

Here, a layer refers to a set of pictures and bitstreams that are classified according to a spatial aspect (for example, picture size), a temporal aspect (for example, encoding order, picture output order, and frame rate), picture quality, complexity, or the like. Further, the base layer may mean a lower layer or a reference layer, and the enhancement layer may mean an upper or higher layer. A plurality of layers may have dependency on each other.

Referring to FIG. 3, for example, the base layer may be defined by standard definition (SD), 15 Hz frame rate, and 1 Mbps bit rate, a first enhancement layer may be defined by high definition (HD), 30 Hz frame rate, and 3.9 Mbps bit rate, and a second enhancement layer may be defined by 4K-ultra high definition (UHD), 60 Hz frame rate, and 27.2 Mbps. These formats, frame rates and bit rates are provided only for illustrative purposes and may be changed and modified as needed. Also, a number of used layers may change depending on circumstances, without being limited to the present embodiment.

For instance, when a transmission bandwidth is 4 Mbps, the first enhancement layer HD may be transmitted at a frame rate reduced to 15 Hz or lower. The scalable video coding method may provide spatial, temporal, and quality scalabilities using the method described above with reference to FIG. 3.

Scalable video coding refers to scalable video encoding in encoding, and to scalable video decoding in a decoding.

The present invention relates to a process of encoding/decoding a video including a plurality of layers or views, wherein the plurality of layers or views may be expressed as first, second, third and n-th layers or views. Although the following description will be made with reference to a picture including a first layer and a second layer, the same process may be applied to pictures including two or more layers or views. The first layer may be represented as a base layer, and the second layer as an upper layer. Further, the first layer may be also represented as a reference layer, and the second layer as an enhancement layer.

A picture/block in the first layer (hereinafter, also referred to as "first-layer picture/block," the same rule applied throughout) corresponding to a second-layer picture/block may be adjusted to a size of the second-layer picture/block. That is, if a size of the first-layer picture/block is smaller than the size of the second-layer picture/block, the first-layer picture/block may be scaled using up-sampling or re-sampling.

The first-layer picture may be added to a reference picture list for the second layer and used for encoding/decoding a second-layer video. Here, the second layer may be subjected to prediction and encoding/decoding using the first-layer picture in the reference picture list, as in general inter prediction.

A block for encoding/decoding may have a square shape with an N×N size, for example, 4×4, 8×8, 16×16, 32×32 and 64×64, or a rectangular shape with an N×M size, for example, 4×8, 16×8 and 8×32, and a block unit may be at least one of a coding block (CB), a prediction block (PB) and a transform block (TB), which may have different sizes.

Hereinafter, a method of generating a prediction block, that is, a prediction signal, of an encoding/decoding target block ("current block" or "target block") in an upper layer will be described in a method of encoding and decoding a scalable video, that is, a video using a multi-layer structure. The following method or apparatus may be generally applied to both an encoding apparatus and a decoding apparatus.

In inter prediction, prediction of the current block may be generally performed based on a reference picture, which is at least one of previous and subsequent pictures of a current picture. A picture used for prediction of the current block is referred to as a reference picture or reference frame.

The reference picture is specified by a reference picture index refIdx, and a region in the reference picture is specified by a motion vector.

In inter prediction, the prediction block for the current block may be generated by selecting the reference picture and a reference block in the reference picture corresponding to the current block.

In inter prediction, the encoding apparatus and the decoding apparatus may derive motion information on the current block and perform inter prediction and/or motion compensation based on the derived motion information. Here, the encoding apparatus and the decoding apparatus use motion information on a reconstructed neighboring block and/or a collocated block in an already reconstructed collocated picture corresponding to the current block, thereby improving encoding/decoding efficiency.

Here, the reconstructed neighboring block, which is a block in the current picture reconstructed via encoding and/or decoding, may include a block adjacent to the current block and/or a block positioned on an outer corner of the current block. Further, the encoding apparatus and the decoding apparatus may determine a predetermined relative position based on a block present at a position spatially corresponding to the current block within the collocated picture and derive the collocated block based on the predetermined relative position (internal and/or external position of the block present at the position spatially corresponding to the current block). For instance, the collocated picture may be one picture among reference pictures included in the reference picture list.

In inter prediction, the prediction block with a minimum residual signal from the current block and a minimum-size motion vector may be generated.

Meanwhile, methods of deriving motion information may vary according to a prediction mode of the current block. An advanced motion vector predictor (AMVP) mode, a merge mode, or the like may be used as a prediction mode for inter prediction.

For example, when the AMVP mode is employed, the encoding apparatus and the decoding apparatus may generate a motion vector candidate list by using a motion vector of the reconstructed neighboring block and/or a motion vector of the collocated block. That is, the motion vector of the reconstructed neighboring block and/or the motion vector of the collocated block may be used as motion vector candidates. The encoding apparatus may transmit a prediction motion vector index indicating an optimal motion vector selected among the motion vector candidates included in the list to the decoding apparatus. In this case, the decoding apparatus may select a prediction motion vector of the current block, using the motion vector index, among the motion vector candidates included in the motion vector candidate list.

The encoding apparatus may calculate a motion vector difference (MVD) between a motion vector of the current block and the prediction motion vector, encode the MVD and transmit the MVD to the decoding apparatus. Here, the decoding apparatus may decode the received MVD and adds the MVD to the prediction motion vector to obtain the motion vector of the current block.

The encoding apparatus may also transmit the reference picture index indicating the reference picture to the decoding apparatus.

The decoding apparatus may predict the motion vector of the current block using motion information on neighboring blocks and derive the motion vector of the current block using a residual received from the encoding apparatus. The decoding apparatus may generate the prediction block for the current block based on the derived motion vector and information of the reference picture index received from the encoding apparatus.

Alternatively, when the merge mode is employed, the encoding apparatus and the decoding apparatus may be generate a merge candidate list using motion information on the reconstructed neighboring block and/or motion information on the collocated block. That is, when the motion information on the reconstructed neighboring block and/or on the collocated block is present, the encoding apparatus and the decoding apparatus may use the motion information as a merge candidate for the current block.

The encoding apparatus may select a merge candidate which provides optimal coding efficiency among merge candidates included in the merge candidate list as motion information for the current block. In this case, a merge index indicating the selected merge candidate may be included in a bitstream to be transmitted to the decoding apparatus. The decoding apparatus may select one of the merge candidates included in the merge candidate list using the transmitted merge index and determine the selected merge candidate as the motion information for the current block. Thus, when the merge mode is employed, the motion information on the reconstructed neighboring block and/or on the collocated block may be used as the motion information for the current block as it is. The decoding apparatus may reconstruct the current block by adding the prediction block to the residual transmitted from the encoding apparatus.

In the aforementioned AMVP and merge modes, the motion information on the reconstructed neighboring block and/or motion information on collocated block may be used in order to derive the motion information on the current block.

In a skip mode as another mode used for inter prediction, information on a neighboring block may be used for the current block as it is. Accordingly, in the skip mode, the encoding apparatus does not transmit syntax information, such as residual, to the decoding apparatus, except for information indicating which block motion information to be used is about as the motion information on the current block.

The encoding apparatus and the decoding apparatus may perform motion compensation on the current block based on the derived motion information, thereby generating the prediction block of the current block. Here, the prediction block may refer to a motion-compensated block generated by performing motion compensation on the current block. Further, a plurality of motion-compensated blocks may form one motion-compensated picture.

The decoding apparatus may verify a skip flag, a merge flag, or the like received from the encoding apparatus and derive motion information needed for inter prediction, for example, information on a motion vector and a reference picture index, accordingly. A processing unit for performing prediction may be different from a processing unit for determining a prediction method and details on the prediction method. For example, a prediction mode may be determined by each PB while prediction may be performed by each TB. Aldo, a prediction mode may be determined by each PB while intra prediction may be performed by each TB.

Pictures encoded/decoded prior to the current picture may be stored in a memory, for example, a decoded picture buffer (DPB), and be used for prediction of the current block or current picture. Pictures available for inter prediction of the current block may be maintained in the reference picture list.

A P slice is a slice decoded by intra prediction, or by inter prediction using at most one motion vector and one reference picture. A B slice is a slice decoded by intra prediction, or by inter prediction using at most two motion vectors and two reference pictures. Here, the reference pictures may include short-term reference pictures (STRPs) and long-term reference pictures (LTRPs). Pictures may be specified by Picture Order Count (POC) which represents display order, in which STRPs may be pictures having an insignificant difference in POC from the current picture and LTRPs may be pictures having a significant difference in POC from the current picture.

Reference picture list 0 ("L0") is a reference picture list used for inter prediction of a P slice or B slice. Reference picture list 1 ("L1") is used for inter prediction of a B slice. Thus, L0 is used for inter prediction of a block of a P slice involved in unidirectional prediction, while L0 and L1 are used for inter prediction of a block of a B slice involved in bidirectional prediction.

The decoding apparatus may construct a reference picture list when decoding a P slice and a B slice through inter prediction. Here, a reference picture used for inter prediction is specified in the reference picture list. A reference picture index refers to an index indicating a reference picture in the reference picture list.

The reference picture list may be constructed based on a reference picture set transmitted from the encoding apparatus. The reference picture set may include a POC of a picture used as a reference picture and a flag (used_by_curr_pic_s0_flag) indicating whether the picture is directly used as a reference. Reference pictures forming the reference picture list may be stored in the memory, for example, the DPB. The pictures stored in the memory, that is, the pictures encoded/decoded prior to the current picture, may be managed by the encoding apparatus and the decoding apparatus.

The reference picture set may include an STRP set including STRPs and an LTRP set including LTRPs, and an initial reference picture list may be constructed based on the STRP set and the LTRP set.

Figure 4:
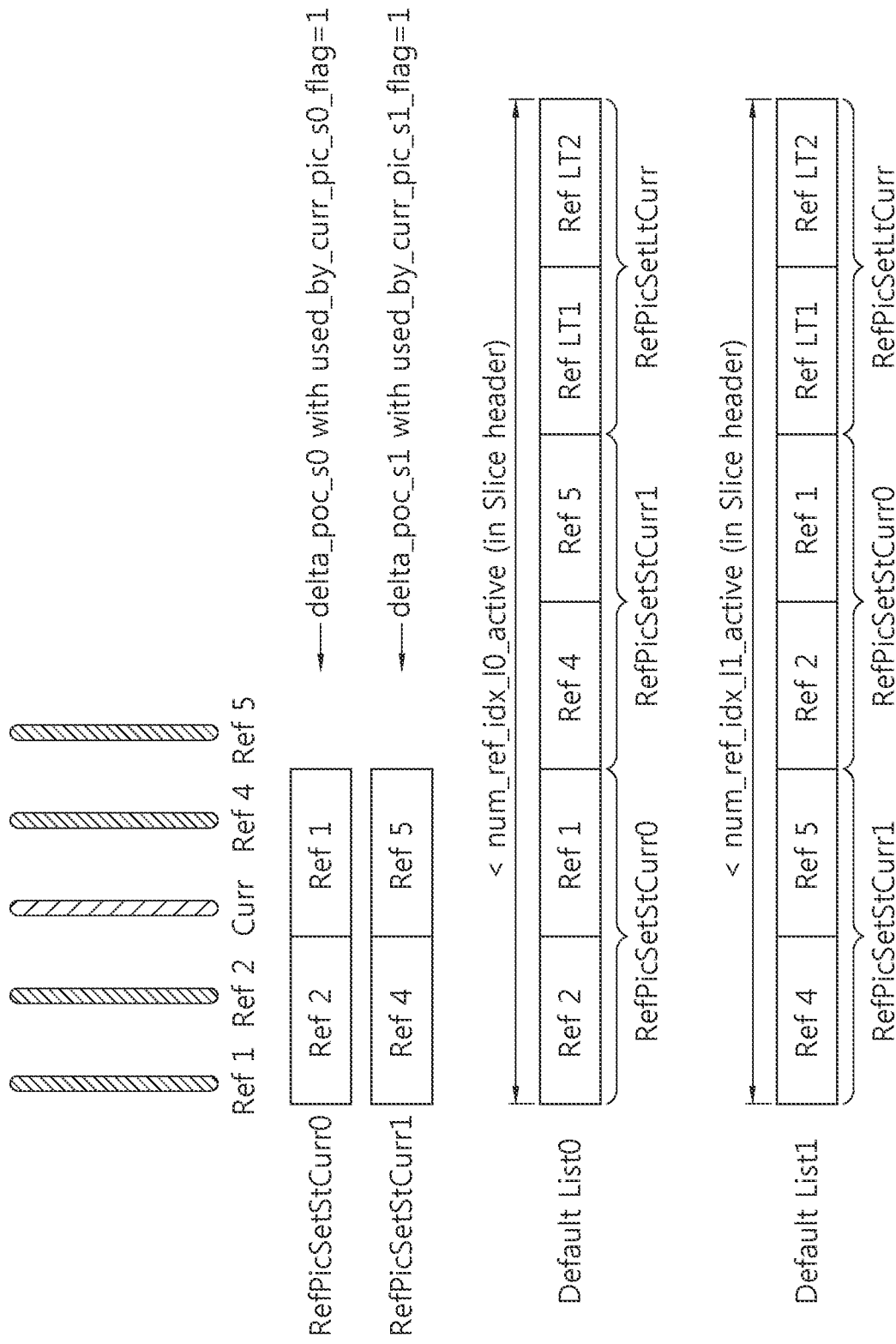
FIG. 4 illustrates an example of constructing a reference picture list.

FIG. 4 illustrates an example of constructing a reference picture list.

Reference pictures may be classified based on a current picture into a first STRP set RefPicSetStCurr0 which includes reference pictures Ref 1 and Ref 2 having a smaller POC than that of the current picture Curr, a second STRP set RefPicSetStCurr1 which includes reference pictures Ref 3 and Ref 4 having a larger POC than that of the current picture, and an LTRP set RefPicSetLtCurr which includes LTRPs Ref LT1 and Ref LT2.

Here, the first STRP set RefPicSetStCurr0 includes pictures having a used_by_curr_pic_s0_flag value of 1 (delta_poc_s0 with used_by_curr_pic_s0_flag=1), and the second STRP set RefPicSetStCurr1 includes pictures having a used_by_curr_pic_s1_flag value of 1 (delta_poc_s1 with used_by_curr_pic_s1_flag=1).

A default reference picture list may be formed using a group of such reference picture sets having different properties.

Referring to FIG. 4, reference picture list 0, L0, sequentially includes the first STRP set RefPicSetStCurr0, the second STRP set 2 RefPicSetStCurr1 and the LTRP set RefPicSetLtCurr.

Reference picture list 1, L1, sequentially includes the second STRP set RefPicSetStCurr1, the first STRP set RefPicSetStCurr0 and the LTRP set RefPicSetLtCurr.

A number of reference pictures to be included in a reference picture list may be determined based on information transmitted from the encoding apparatus. For example, the encoding apparatus may construct a reference picture list, determine a number of reference pictures to use and transmit information on the number of reference pictures to use, for example, num_ref_idx_1X_default_active_minus1 where X=0 or 1, to the decoding apparatus as a syntax element of a sequence parameter set (SPS). The decoding apparatus may use the number of reference pictures, specified by a value of num_ref_idx_1X_default_active_minus1 plus 1, as a default in a current sequence.

Further, to specify a number of reference pictures by picture or slice, the encoding apparatus may transmit extra information indicating a number of reference pictures, for example, num_ref_idx_11_active_minus1 where X=0 or 1, through a picture parameter set (PPS) or slice header. The decoding apparatus may apply a specified value of num_ref_idx_11_active_minus1 plus 1 as the number of reference pictures for a current picture or current slice.

In inter prediction, motion compensation may be carried out using a specified reference picture in the reference picture list constructed as above.

In a multi-layer structure providing spatial scalability or multi-view scalability, reference pictures in an upper layer may include reference pictures in the same layer and an inter-layer reference picture.

In this case, the inter-layer reference picture may be signaled through information for identifying a layer and information for identifying a reference picture. For example, if a picture in a j-th layer is present in the same access unit as a current picture in an i-th layer and an identifier of the picture, nuh_layer_id, transmitted in a network abstraction layer (NAL) unit header has the same value as a RefPicLayerId value for the current picture, i being greater than j, the picture may be determined to be used as a reference picture for the current picture. The inter-layer reference picture may represent an LTRP.

RefPicLayerId, which is a value signaled through a syntax element inter_layer_pred_layer_idc included in a slice header, means a layer that a current layer refers to for inter-layer prediction.

Meanwhile, when a picture of a lower layer is added to a reference picture list for an upper layer, the picture of the lower layer may be subjected to a single fixed filter and then added to the reference picture list for the upper layer. In this case, however, coding efficiency may decrease.

When two filters are applied to a picture of the lower layer, one or more pictures may be added to the reference picture list, and thus information for constructing or signaling the reference picture list may increase.

Accordingly, in applying a filter to a lower-layer picture, the present invention adaptively selects/employs one or more filters for a predetermined unit and adds one lower-layer picture to an upper-layer reference picture list, thereby enhancing coding efficiency and preventing an increase in complexity of constructing the reference picture list.

Figure 5:
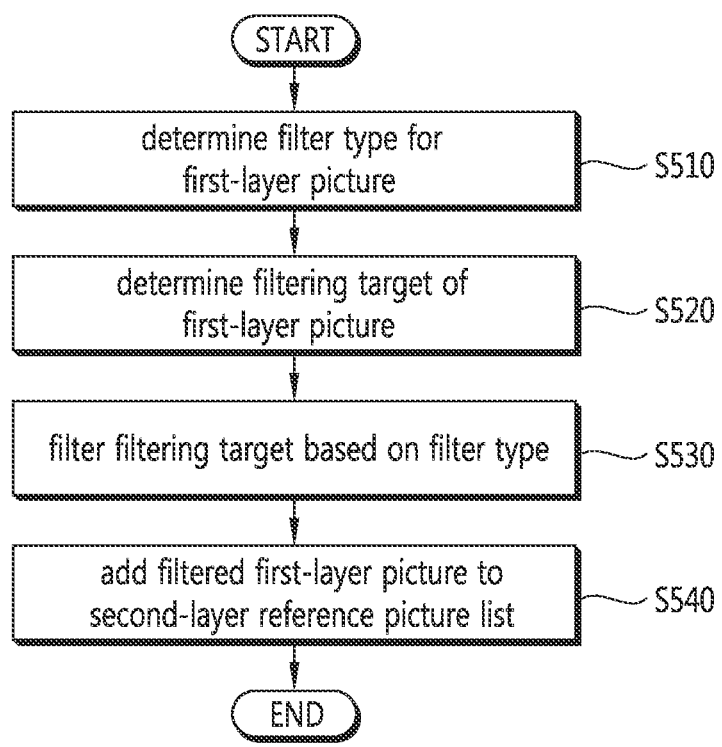
FIG. 5 is a flowchart illustrating a video processing method according to the present invention.

FIG. 5 is a flowchart illustrating a video processing method according to the present invention. In detail, FIG. 5 illustrates a method of encoding and decoding a multi-layer video which uses a first-layer picture when encoding and decoding a second-layer picture. The method of FIG. 5 may be applied to both a video decoding method and a video encoding method.

First, for filtering a first-layer picture, the encoding apparatus and the decoding apparatus determine a type of a filter for the first-layer picture (S510). The first-layer picture is decoded before the type of the filter is determined, in which the first-layer picture and the second-layer picture may be decoded by different components or modules. The encoding apparatus and the decoding apparatus may respectively include decoding modules having the configurations illustrated in FIGS. 1 and 2 for decoding the first-layer picture and decoding modules having the configurations illustrated in FIGS. 1 and 2 for decoding the second-layer picture.

Figure 6:
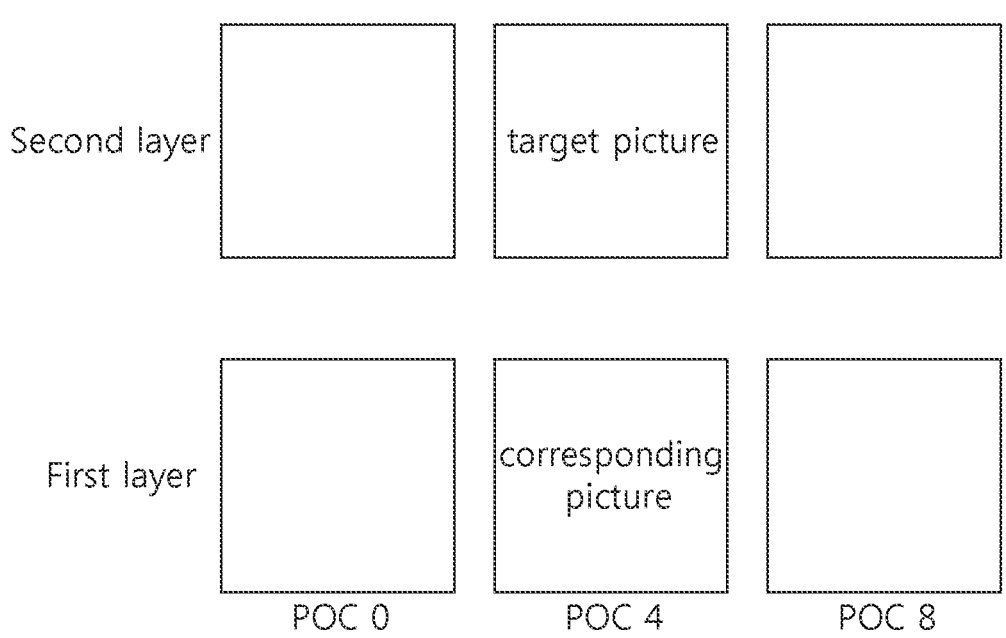
FIG. 6 illustrates pictures in a plurality of layers according to the present invention.

FIG. 6 illustrates pictures in a plurality of layers according to the present invention. As shown in FIG. 6, a second-layer picture may be a target picture to be encoded and decoded, and a first-layer picture is a corresponding picture to the target picture, which may be a reference picture of the second-layer picture.

The target picture and the corresponding picture have the same POC, for example, a POC of 4. For prediction of the target picture, the corresponding picture having a POC of 4 and a second-layer picture having a POC of 0 or 8 may be used.

The second-layer target picture to be encoded/decoded may have a size the same as or different from that of the first-layer corresponding picture. The second-layer target picture and the first-layer corresponding picture may have the same size but have different characteristics of signals. Thus, a first-layer reconstructed picture may be subjected to up-sampling or re-sampling so that the pictures of the two layers have the same size or the signal characteristics are changed, thereby improving prediction efficiency.

A filter may be applied for sampling, in which different filters may be used for a luma component or a chroma component.

The encoding apparatus and the decoding apparatus may determine a single fixed filter as the filter for the first-layer picture or adaptively select one or more filters for the first-layer picture.

When a fixed filter is employed for the first-layer picture, the encoding apparatus and the decoding apparatus may apply a default interpolation filter to the first-layer corresponding picture.

The default filter may have a filter set for luma/chroma signals illustrated below in Tables 1 and 2, and a phase and filter coefficient may vary depending on a ratio in size between pictures in layers.

TABLE 1

| phase p | interpolation filter coefficients | | | | | | | |
|---|---|---|---|---|---|---|---|---|
| | $f_L[p, 0]$ | $f_L[p, 1]$ | $f_L[p, 2]$ | $f_L[p, 3]$ | $f_L[p, 4]$ | $f_L[p, 5]$ | $f_L[p, 6]$ | $f_L[p, 7]$ |
| 0 | 0 | 0 | 0 | 64 | 0 | 0 | 0 | 0 |
| 1 | n/a | n/a | n/a | n/a | n/a | n/a | n/a | n/a |
| 2 | n/a | n/a | n/a | n/a | n/a | n/a | n/a | n/a |
| 3 | n/a | n/a | n/a | n/a | n/a | n/a | n/a | n/a |
| 4 | n/a | n/a | n/a | n/a | n/a | n/a | n/a | n/a |
| 5 | −1 | 4 | −11 | 52 | 26 | −8 | 3 | −1 |
| 6 | n/a | n/a | n/a | n/a | n/a | n/a | n/a | n/a |
| 7 | n/a | n/a | n/a | n/a | n/a | n/a | n/a | n/a |
| 8 | −1 | 4 | −11 | 40 | 40 | −11 | 4 | −1 |
| 9 | n/a | n/a | n/a | n/a | n/a | n/a | n/a | n/a |
| 10 | n/a | n/a | n/a | n/a | n/a | n/a | n/a | n/a |
| 11 | −1 | 3 | −8 | 26 | 52 | −11 | 4 | −1 |
| 12 | n/a | n/a | n/a | n/a | n/a | n/a | n/a | n/a |
| 13 | n/a | n/a | n/a | n/a | n/a | n/a | n/a | n/a |
| 14 | n/a | n/a | n/a | n/a | n/a | n/a | n/a | n/a |
| 15 | n/a | n/a | n/a | n/a | n/a | n/a | n/a | n/a |

TABLE 2

| phase p | interpolation filter coefficients | | | |
|---|---|---|---|---|
| | fC[p, 0] | fC[p, 1] | fC[p, 2] | fC[p, 3] |
| 0 | 0 | 64 | 0 | 0 |
| 1 | n/a | n/a | n/a | n/a |
| 2 | n/a | n/a | n/a | n/a |
| 3 | n/a | n/a | n/a | n/a |
| 4 | −4 | 54 | 16 | −2 |
| 5 | −6 | 52 | 20 | −2 |
| 6 | −6 | 46 | 28 | −4 |
| 7 | n/a | n/a | n/a | n/a |
| 8 | −4 | 36 | 36 | −4 |
| 9 | −4 | 30 | 42 | −4 |
| 10 | n/a | n/a | n/a | n/a |
| 11 | −2 | 20 | 26 | −6 |
| 12 | n/a | n/a | n/a | n/a |
| 13 | n/a | n/a | n/a | n/a |
| 14 | −2 | 10 | 58 | −2 |
| 15 | 0 | 4 | 62 | −2 |

Table 1 illustrates 16-phase re-sampling filter coefficients for a luma signal, and Table 2 illustrates 16-phase re-sampling filter coefficients for a chroma signal.

Here, phase 0 may mean a filter coefficient for a sample at an integer position, providing an unfiltered result.

Alternatively, the encoding apparatus and the decoding apparatus may apply an alternative filter as a fixed filter to the first-layer corresponding picture or a picture having been subjected to the default filter.

The alternative filter may have a filter set including one or more filter coefficients, similar to the aforementioned default filter. In this case, the filter coefficients may be determined by the encoding apparatus and signaled to the decoding apparatus.

The alternative filter may be applied to the picture having been subjected to the default filter and refer to a filter for the sample at the integer position corresponding to phase 0 of the default filter. Here, the alternative filter may have fixed filter coefficients, for example, [−1, 3, 12, 3, −1]/16.

In a video supporting quality scalability (SNR scalability), the first-layer picture has the same size as the second-layer picture and thus may not be subjected to filtering. However, in the present invention, the first-layer corresponding picture may be subjected to the alternative filter so as to change signal characteristics of the first layer.

Here, a flag indicating whether the alternative filter is used may be signaled through at least one of a video parameter set, a sequence parameter set, a picture parameter set and a slice header.

In another embodiment, the encoding apparatus and the decoding apparatus may adaptively apply one or more filters to the first-layer corresponding picture, instead of the fixed filter.

For instance, in a video supporting spatial scalability, the encoding apparatus and the decoding apparatus may apply the default filter to a first-layer picture and then always apply the alternative filter to a sample at an integer position. Here, the decoding apparatus may filter the picture by adaptively applying the two filters, the default filter and the alternative filter, without additional signaling from the encoding apparatus.

According to still another embodiment, in a video supporting spatial scalability, the encoding apparatus and the decoding apparatus apply the default filter to a first-layer picture. Then, the decoding apparatus may determine based on a flag signaled from the encoding apparatus whether to apply the alternative filter.

The encoding apparatus may apply the default filter to the first-layer picture and then apply the alternative filter to a sample at an integer position. After the alternative filter is applied to the sample at the integer position, the encoding apparatus may calculate at least one of rate-distortion optimization (RDO), a sum of absolute differences (SAD) and a sum of absolute transformed differences (SATD) to determine whether to apply the alternative filter. If a calculation result shows that applying the alternative filter produces a better effect than applying no alternative filter, the encoding apparatus may determine to apply the alternative filter to the sample at the integer position. A signal regarding whether to apply the alternative filter, that is, a flag indicating whether to apply the alternative filter, may be signaled through at least one of a video parameter set, a sequence parameter set, a picture parameter set and a slice header.

In yet another embodiment, the encoding apparatus and the decoding apparatus may apply the default filter to a first-layer picture in a video supporting spatial scalability and apply the alternative filter to a first-layer picture in a video supporting quality scalability.

In still another embodiment, the encoding apparatus and the decoding apparatus may adaptively select and apply a filter based on a correlation between samples. That is, a correlation between samples is calculated by specific block unit of 4×4, 8×8, 16×16, 32×32 or 64×64, and compared with a specific threshold, thereby adaptively applying a filter. Here, the correlation between the samples may be calculated based on the first-layer corresponding picture (reconstructed picture) or the picture having been subjected to the default filter, and the threshold may vary depending on spatial scalability or quality scalability.

For instance, in a 4×4 block shown in FIG. 7, the encoding apparatus and the decoding apparatus may calculate vertical activity (VA) and horizontal activity (HA) using Equation 1.

$$VA = |2R_{(i,j)} - R_{(i-1,j)} - R_{(i+1,j)}|$$

$$HA = |2R_{(i,j)} - R_{(i,j-1)} - R_{(i,j+1)}| \quad \text{[Equation 1]}$$

Here, i and j are 0 and 2.

When VA and HA are calculated by Equation 1, block activity may be calculated by Equation 2.

$$\text{Block activity} = (VA + HA) >> 2 \quad \text{[Equation 2]}$$

If the block activity is smaller than the threshold, the encoding apparatus and the decoding apparatus may apply the alternative filter to the target block. Otherwise, that is, if the block activity is the threshold or greater, the encoding apparatus and the decoding apparatus may not apply the alternative filter.

The same process of calculating VA, HA and block activity and applying the alternative filter may be employed for an 8×8 block or larger blocks.

Alternatively, in an N×N block, the encoding apparatus and the decoding apparatus may apply the alternative filter to the target block if a vertical sample and a horizontal sample satisfy Equation 3; and may not apply the alternative filter otherwise.

$$\text{Abs}(p[-1][N>>1-1] + p[N-1][N>>1-1] - 2*p[N>>1-1][N>>1-1]) < (1>>(\text{BitDepth}Y - 5))$$

$$\text{Abs}(p[N>>1-1][-1] + p[N>>1-1][N-1] - 2*p[N>>1-1][N>>b1-1]) < (1>>(\text{BitDepth}Y - 5)) \quad \text{[Equation 3]}$$

Here, p[x][y] may be a sample value at a (x, y) position, Abs may be an absolute value, and BitDepthY may be a bit depth of a luma signal.

As such, according to the present invention, either of the fixed filters of the default filter and the alternative filter may be applied, or either or both of the default filter and the alternative filter may be selectively applied when the first-layer picture is filtered.

When the type of the filter for the first-layer picture is determined, the encoding apparatus and the decoding apparatus may determine a target to which the filter is applied (S520).

The encoding apparatus and the decoding apparatus may apply the fixed filter or adaptive filter by first-layer corresponding picture, slice, coding unit (CU), prediction unit (PU), transform unit (TU) and N×N unit.

For example, the encoding apparatus may determine whether to use the alternative filter for each picture and signal a flag indicating whether to use the filter through a PPS.

The decoding apparatus may determine based on the signaled flag whether to use the alternative filter and perform filtering by picture.

In another embodiment, the encoding apparatus may determine whether to use the alternative filter for each slice and signal a flag indicating whether to use the filter through a slice header. The decoding apparatus may determine based on the signaled flag whether to use the alternative filter and perform filtering by slice.

Alternatively, the encoding apparatus and the decoding apparatus may analyze a correlation between samples in each PU and adaptively apply the default filter or alternative filter. In this case, as the encoding apparatus and the decoding apparatus may separately analyze the correlation between the samples and adaptively perform filtering, signaling whether to perform filtering may not be additionally needed.

For instance, a predetermined unit for adaptive filtering may be determined, and the default filter or alternative filter may be applied to each predetermined unit. Here, the alternative filter may be a filter for filtering a sample at an integer position.

When the predetermined unit is 8×8, a correlation between samples is derived by 8×8 unit for the first-layer picture, followed by adaptive filtering.

When the type of the filter and the target of filtering are determined in S510 and S520, the encoding apparatus and the decoding apparatus filter the first-layer picture using a single filter or one or more filters in combination (S530). That is, the encoding apparatus and the decoding apparatus may filter the target of filtering using the determined filter.

Subsequently, the encoding apparatus and the decoding apparatus may add the filtered first-layer picture to a second-layer reference picture list (S540). The first-layer picture may be added to the second-layer reference picture list by a prediction module for decoding the second-layer picture.

When encoding and decoding the second-layer target picture, one or more first-layer pictures obtained via filtering may be added for use to a random position of reference picture list 0 or reference picture list 1 for the second layer.

In this case, the encoding apparatus and the decoding apparatus may allocate a first-layer picture to a random index in the reference picture list.

Figure 8:
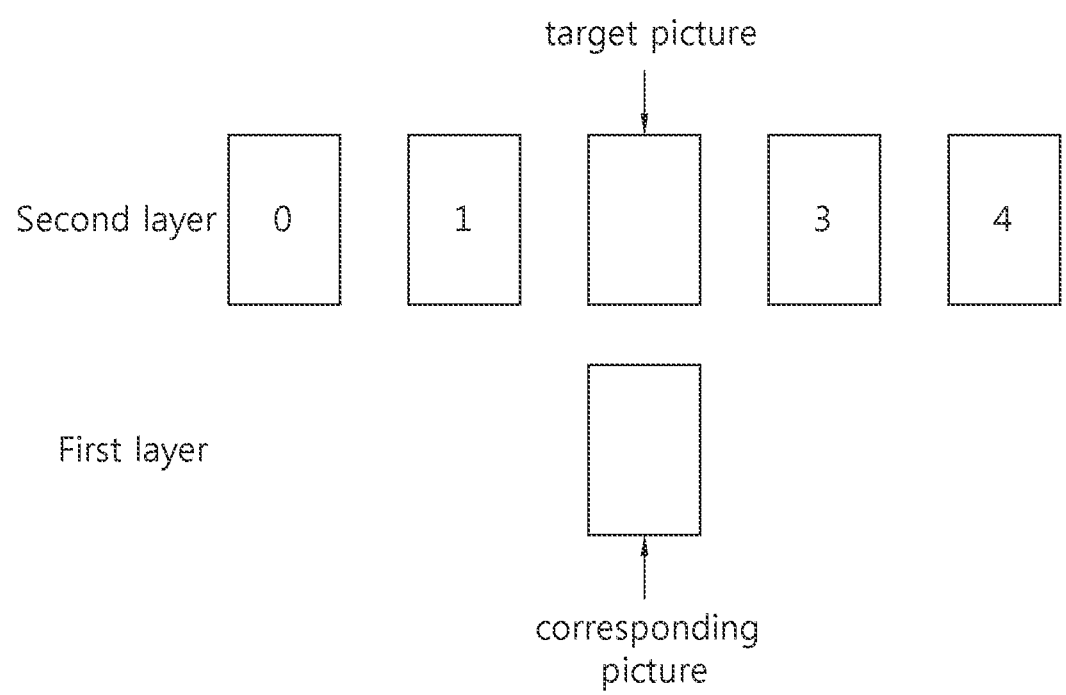
FIG. 8 illustrates POCs of first-layer and second-layer pictures according to the present invention.

FIG. 8 illustrates POCs of first-layer and second-layer pictures according to the present invention. Referring to FIG. 8, a target picture of encoding and decoding may be a second-layer picture having a POC of 2 and refer to a first-layer corresponding picture, a picture having a smaller POC than the second-layer picture, for example, pictures with a POC of 0 or 1, and a picture having a larger POC than the second-layer picture, for example, pictures with a POC of 3 or 4, as STRPs. Further, the target picture may also refer to an LTRP (not shown).

Figure 9A:
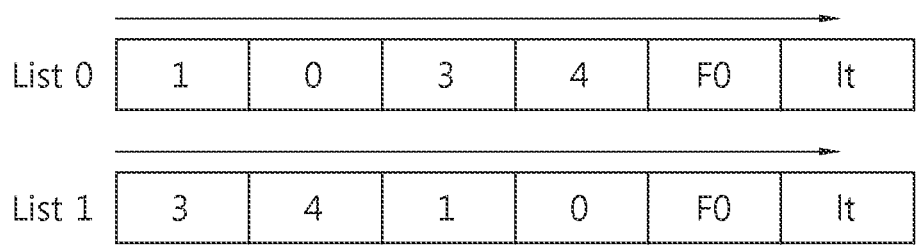
FIG. 9A and FIG. 9B illustrate a reference picture list according to the present invention.
Figure 9B:
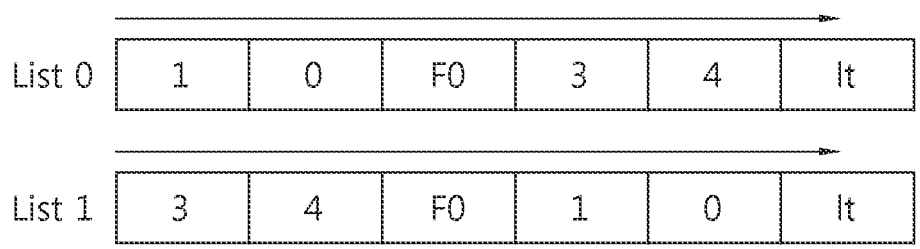

FIG. 9A and FIG. 9B illustrate a reference picture list according to the present invention. As shown in FIG. 9A and FIG. 9B, when a reference picture is added to a reference picture list, the encoding apparatus and the decoding apparatus may add a first-layer picture F0 to a random position.

For example, referring to FIG. 9A, the encoding apparatus and the decoding apparatus may construct reference picture list 0, List 0, by sequentially adding STRPs having a smaller POC (pictures with POCs of 0 and 1) than that of a current target picture, STRPs having a greater POC, pictures with POCs of 3 and 4, than that of the current target picture, the first-layer picture F0, and finally an LTRP 1t to List 0.

Similarly, reference pictures list 1, List 1, may be constructed by sequentially including the STRPs having the greater POC (pictures with POCs of 3 and 4) than that of the current target picture, the STRPs having the smaller POC (pictures with POCs of 0 and 1) than that of the current target picture, the first-layer picture F0, and the LTRP 1t.

In another embodiment, the encoding apparatus and the decoding apparatus may construct a reference picture list as in FIG. 9B. Referring to FIG. 9B, reference picture list 0, List 0, may be constructed by sequentially including the STRPs having the smaller POC (pictures with POCs of 0 and 1) than that of the current target picture, the first-layer picture F0, the STRPs having the greater POC (pictures with POCs of 3 and 4) than that of the current target picture, and the LTRP 1t.

Similarly, reference picture list 1, List 1, may be constructed by sequentially including the STRPs having the greater POC (pictures with POCs of 3 and 4) than that of the current target picture, the first-layer picture F0, the STRPs having the smaller POC (pictures with POCs of 0 and 1) than that of the current target picture, and the LTRP 1t.

In still another embodiment, the encoding apparatus and the decoding apparatus may add the first-layer picture F0 last to each list. That is, second-layer reference pictures corresponding to 1, 0, 3, 4 and 1t may be added to List 0, and then the first-layer picture F0, obtained via filtering, may be finally added to List 0. Also, the first-layer picture F0 may be finally added to List 1 following 3, 4, 1, 0 and 1t.

Meanwhile, in one embodiment, a different number of first-layer pictures may be added to each list, and a filter applied to pictures added to each list may be a specified fixed filter or be determined by the encoding apparatus and signaled to the decoding apparatus.

Figure 10:
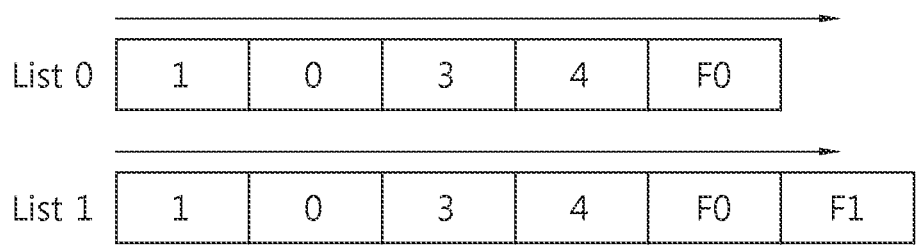
FIG. 10 illustrates a reference picture list for a P slice according to an exemplary embodiment of the present invention.

FIG. 10 illustrates a reference picture list for a P slice according to an exemplary embodiment of the present invention.

Referring to FIG. 10, a single picture F0 obtained by filtering a first-layer picture may be added last to reference picture list 0 for a P slice. Here, pictures 1, 0, 3 and 4 may be second-layer reference pictures, and F0 may be a picture obtained by filtering the first-layer corresponding picture using one of the foregoing filtering methods.

Also, referring to FIG. 10, the encoding apparatus and the decoding apparatus may add two pictures F0 and F1, obtained by filtering a first-layer picture, to reference picture list 1 for a P slice following the second-layer reference pictures. Here, F0 and F1 may be pictures obtained by filtering the first-layer corresponding picture using one of the foregoing filtering methods illustrated in FIGS. 5 to 7.

Figure 11A:
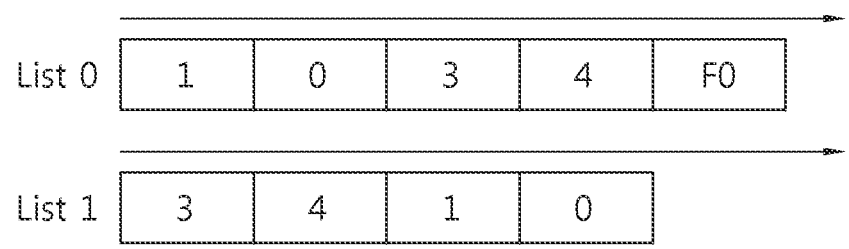
Figure 11B:
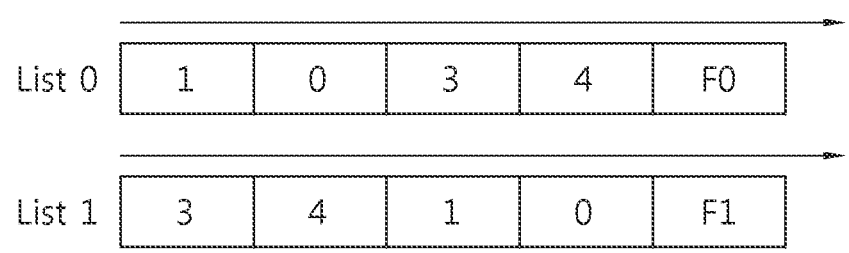
Figure 11C:
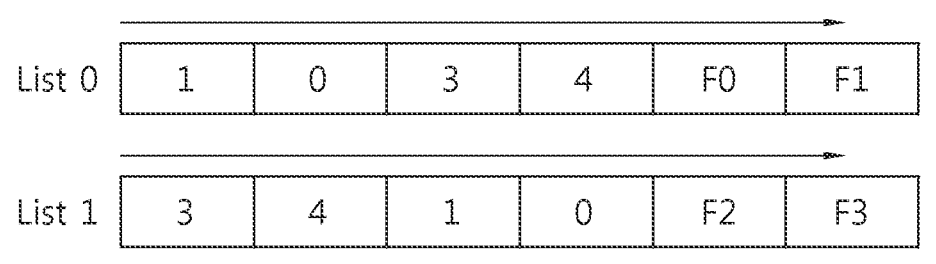

FIG. 11A, FIG. 11B and FIG. 11C illustrate a reference picture list for a B slice according to an exemplary embodiment of the present invention.

Referring to FIG. 11A, the encoding apparatus and the decoding apparatus may add a single picture F0 obtained by filtering a first-layer picture to reference picture list 0 or reference picture list 1 for a B slice. Here, the first-layer picture F0 may be a picture obtained by filtering the first-layer corresponding picture using one of the foregoing filtering methods illustrated in FIGS. 5 to 7.

Also, referring to FIG. 11B, the encoding apparatus and the decoding apparatus may add two pictures obtained by filtering a first-layer picture to reference picture list 0 and reference picture list 1 for a B slice. Here, F0 and F1 may be pictures obtained by filtering the first-layer corresponding picture using one of the foregoing filtering methods illustrated in FIGS. 5 to 7, which may be the same.

For example, when the encoding apparatus determines to use the alternative filter through an SATD, F0 may be a picture filtered by the default filter and F1 may be a picture filtered by the default filter and then by the alternative filter.

Here, regarding quality scalability, F0 may be the corresponding picture which is unfiltered and F1 may be a picture filtered by the alternative filter.

Alternatively, referring to FIG. 11C, the encoding apparatus and the decoding apparatus may add four pictures F0, F1, F2 and F3, obtained by filtering a first-layer picture, to reference picture list 0 and reference picture list 1 for a B slice. Here, F0, F1, F2 and F3 may be pictures obtained by filtering the first-layer corresponding picture using one of the foregoing filtering methods, wherein at least two or more may be the same.

As described above, the present invention provides a video decoding method of adaptively applying one or more filters to a lower-layer picture and adding the picture to a reference picture list for an upper layer to reduce a prediction error in the upper layer and to improve encoding efficiency, and an apparatus using the same.

Accordingly, the video decoding method and the apparatus using the same may enhance encoding efficiency without increasing the reference picture list.

In the aforementioned embodiments, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

The foregoing embodiments include various aspects of examples. Although all possible combinations to illustrate various aspects may not described herein, it will be understood by those skilled in the art that various combinations may be made therein without departing from the spirit and scope of the invention as defined by the appended claims. Therefore, all differences, changes and modifications within the scope will be construed as being included in the present invention.

The invention claimed is:

1. A video decoding method supporting a plurality of layers, the method performed by a video decoding apparatus and comprising:

generating a reference picture list of a current slice in a current layer, the reference picture list including an inter-layer reference picture in a reference layer of the current layer;

generating a prediction block of a current block included in the current slice by referencing at least one of a plurality of reference pictures included in the reference picture list, motion information for generating the prediction block being derived from one of merge candidates of the current block; and generating a reconstructed block of the current block included in the current slice using the prediction block, wherein the inter-layer reference picture is marked as only a long-term reference picture and added to the reference picture list for inter-layer prediction, wherein the prediction block of the current block is generated by applying an interpolation filter to the inter-layer reference picture in response to the inter-layer reference picture being determined to be referenced by the current block, wherein a position of the inter-layer reference picture in the reference picture list is determined based on inter-layer reference picture information, wherein the interpolation filter for the current block is one of a plurality of interpolation filter candidates, wherein the interpolation filter for the current block is determined implicitly based on a scaling ratio for the inter-layer reference picture, and wherein filter coefficients for the interpolation filter are determined differently depending on whether an integer-positioned pixel or a fractional-positioned pixel is generated.

2. The method of claim 1, wherein the scaling ratio is derived based on a size of the inter-layer reference picture and a size of a current picture including the current slice.

3. The method of claim 1, wherein a set of filter coefficients is different for each of the plurality of interpolation filter candidates.

4. A video encoding method supporting a plurality of layers, the method performed by a video encoding apparatus and comprising:

generating a reference picture list of a current slice in a current layer, the reference picture list including an inter-layer reference picture in a reference layer of the current layer; and generating a prediction block of a current block included in the current slice by referencing at least one of a plurality of reference pictures included in the reference picture list, information specifying an index of merge candidate which has same motion information as the current block being encoded into a bitstream, wherein the inter-layer reference picture is marked as only a long-term reference picture and added to the reference picture list for inter-layer prediction, wherein the prediction block of the current block is generated by applying an interpolation filter to the inter-layer reference picture in response to the inter-layer reference picture being determined to be referenced by the current block, wherein inter-layer reference picture information indicating a position of the inter-layer reference picture in the reference picture list is encoded into the bitstream, wherein the interpolation filter for the current block is one of a plurality of interpolation filter candidates, wherein the interpolation filter for the current block is determined implicitly based on a scaling ratio for the inter-layer reference picture, and wherein filter coefficients for the interpolation filter are determined differently depending on whether an integer-positioned pixel or a fractional-positioned pixel is generated.

5. A non-transitory computer-readable medium storing a bitstream generated by a video encoding method, the video encoding method comprising:

generating a reference picture list of a current slice in a current layer, the reference picture list including an inter-layer reference picture in a reference layer of the current layer; and generating a prediction block of a current block included in the current slice by referencing at least one of a plurality of reference pictures included in the reference picture list, information specifying an index of merge candidate which has same motion information as the current block being included in the bitstream, wherein the inter-layer reference picture is marked as only a long-term reference picture and added to the reference picture list for inter-layer prediction, wherein the prediction block of the current block is generated by applying an interpolation filter to the inter-layer reference picture in response to the inter-layer reference picture being determined to be referenced by the current block, wherein inter-layer reference picture information indicating a position of the inter-layer reference picture in the reference picture list is included in the bitstream, wherein the interpolation filter for the current block is one of a plurality of interpolation filter candidates, wherein the interpolation filter is determined implicitly based on a scaling ratio for the inter-layer reference picture, and wherein filter coefficients for the interpolation filter are determined differently depending on whether an integer-positioned pixel or a fractional-positioned pixel is generated.

* * * * *